Oct. 1, 1957 A. R. THOMAS 2,808,461

HANDSET

Filed March 18, 1954

INVENTOR.
ALDRICH R. THOMAS
BY Kenway Jenney Witter & Hildreth
ATTORNEYS 2,808,461
Patented Oct. 1, 1957

2,808,461

HANDSET

Aldrich R. Thomas, Cheshire, Conn., assignor to The Wheeler Insulated Wire Company, Incorporated, Waterbury, Conn., a corporation of Delaware Application March 18, 1954, Serial No. 417,002
3 Claims. (Cl. 179—81)

Figure 1:
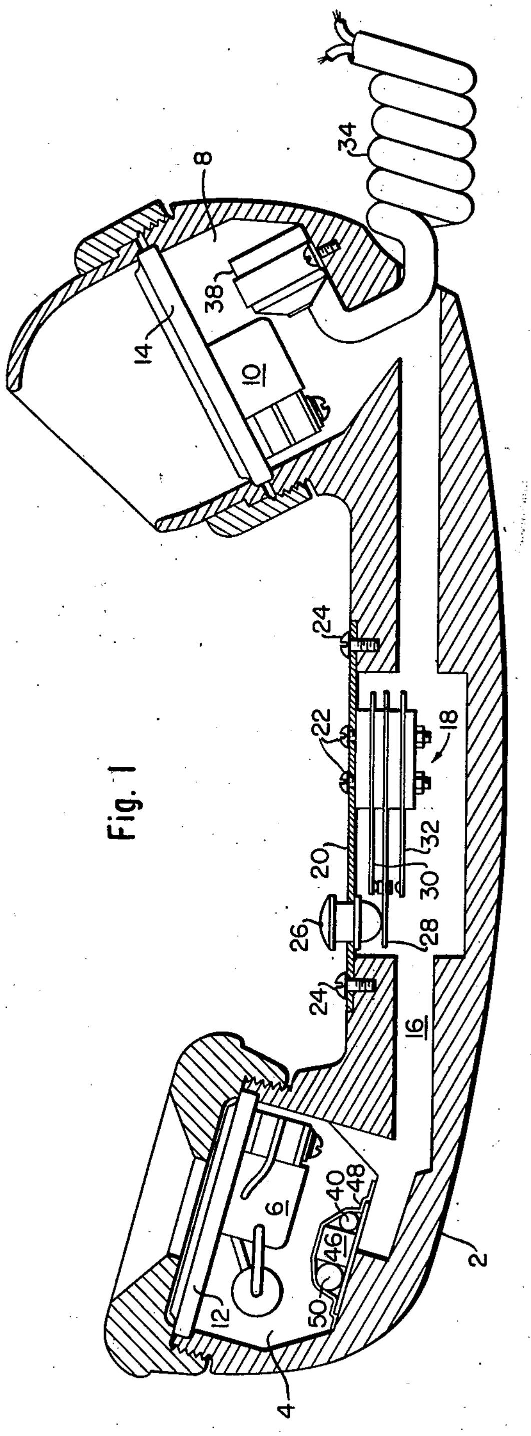

The present invention relates to telephone instruments, and more particularly to a self-contained, hand-held instrument having an amplifier for the transmitted signal, and alternative provision for use of the instrument as a sound-powered device in the event of failure of the amplification circuit.

Sound-powered telephone systems have long been used in certain wire communication systems, and have been found especially suitable for application wherein local or common power supplies are difficult to maintain, or wherein service must be maintained in spite of failure of the power supply. The limitations are, of course, also well known, and among these is the permissible length of the communication line and its impedance.

A principal object of this invention is to provide a telephone instrument adapted for use as a sound-powered unit, while at the same time providing amplification means contained within the instrument itself and a local battery or equivalent power supply, whereby the transmitted signal is normally amplified.

An additional object is to provide means whereby the operator of the instrument may alternately transmit an amplified voice message, or a sound-powered message in the event of failure of the amplifier or of the local power source.

With these and other objects in view, the invention comprises a compact hand-held instrument similar in size and appearance to the hand piece used in the familiar commercial telephone systems. Within the recesses provided for the mouthpiece and earpiece, and within the passage connecting these recesses, are situated a push button or equivalent device and electronic elements including a local power source and a single-stage transistor amplifier connected with the mouthpiece. For normal transmission, the push button is depressed or actuated to a position in which the voice message generated in the mouthpiece transducer is amplified and connected with the communications line. When the button is released or moved back to its "normal" position, the receiving transducer in the earpiece is connected across the communication line. This is the normal condition of the circuit for receiving a message, but there is also thus provided an appropriate arrangement whereby a sound-powered voice message may be transmitted, if desired, by speaking into the earpiece.

Other features of the invention comprise certain features of construction, arrangements and adaptations which will become apparent from the description to follow, and from the appended claims.

Figure 2:
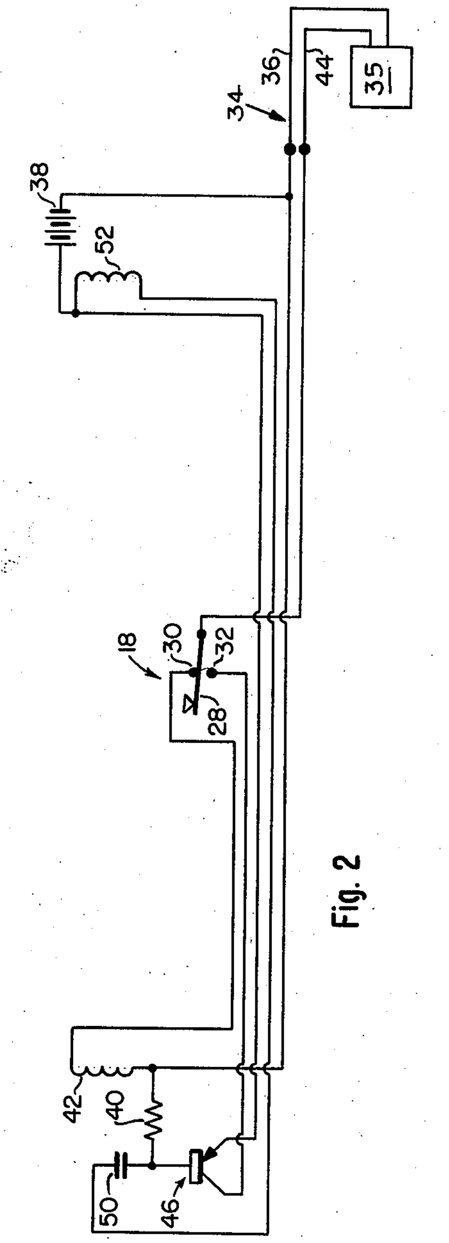

The invention will be described with reference to a preferred embodiment as illustrated in the drawings, wherein:

Fig. 1 is an elevation in section of the instrument showing the arrangement of the various parts; and Fig. 2 is a circuit diagram showing the connections of the elements within the instrument.

Referring to Fig. 1, the instrument is provided with a suitable body or shell 2 which is formed of a suitable material such as thermo-setting resin, the external form of which is like that of the familiar handset in present-day use. At one end of the shell there is provided a recess 4 in which is mounted a receiving transducer 6, and in the other end there is a recess 8 in which is mounted a transmitting transducer 10. The transducers 6 and 10 may be of any suitable type, and include diaphragm units 12 and 14, respectively. The unit 6 is capable of electrical-acoustical transmission in either direction, and preferably includes an electromagnetic coil and a magnetic path including a movable part secured to the diaphragm unit in the conventional manner. The unit 10 is used only for transmission, and may be of a similar type.

A channel 16 having an enlarged central portion extends between the recesses in the ends of the body 2. A suitable switch 18, preferably of the spring type as illustrated, is mounted in the enlarged central portion by means of a mounting plate 20, bolts 22 securing the switch to the mounting plate, and screws 24 threaded into the body portion of the instrument. A push button 26 is received through a hole in the plate 20, and is normally pushed outwardly by the center contact spring 28 of the switch.

As illustrated, the center contact 28 normally pushes the button 26 outwardly and makes contact with a side contact 30. When the button 26 is depressed, the contact 28 makes contact with a second side contact 32.

A two-wire transmission cord 34 which is connected with an external transmission circuit 35 is reecived through an open end of the channel 16. The connections for the two wires are shown in Fig. 2. An upper wire 36 is connected with the negative terminal of a battery 38, which is preferably of the long-life, low-drain type, such as a mercury cell. It is also connected with the common connection of a resistor 40 and the coil of the receiving transducer 42.

The other wire 44 of the transmission line is connected to the center contact 28 of the switch 18. The terminal of the transducer 42 opposite to its common connection with the resistor 40 is connected with the normally-closed side contact 30 of the switch.

A transistor 46 which may, for example, be of the PNP germanium junction-type, is secured by a strap 48 or other suitable means within the receiving transducer recess 4. The transistor is preferably taped together with the resistor 40 and with a capacitor 50, these parts thus making up a single sub-assembly. The resistor 40 and capacitor 50 are connected to the base of the transistor. The capacitor is in series with the coil 52 of the transmitting transducer 10. The other terminal of the transmitting transducer coil is connected with both the positive terminal of the battery 38 and the emitter of the transistor. The collector of the transistor is connected with the normally-open side contact 32 of the switch 18.

The resistor 40 is large relative to the impedance between the emitter and base of the transistor. The battery 38 provides a positive bias for the emitter, and by reason of these relative impedances the current change resulting from any change in the emitter-base impedance of the transistor will be relatively small and inconsequential. This feature is of considerable value, since it reduces the effect of aging of the transistor.

Also, when the button 26 is depressed, the battery 38 provides a negative bias for the collector. Thus, the same battery provides bias for both the emitter and collector, in the appropriate polarities for operation of the transistor. The circuit is also suitable for junction transistors of the NPN type, the only requirement being that the battery 38 is reversed.

Since the drain upon the battery 38 is of a relatively low value, it is possible to adapt the instrument to operate upon light power in place of the battery. To this end, it is merely necessary to connect an appropriate photo-voltaic device in place of the battery. Such devices are well known in the art, and may consist, for example, of suitable junctions of conductors and semi-conductors, in which a voltage is generated upon the impingement of light. One example is a junction of selenium and a metal, and another is a junction of copper and copper oxide. It will be understood that such an arrangement provides a gain which is dependent upon the intensity of the available light; and that operation at night would be precluded. However, for night use, the sound-powered connection would still be available for use.

As previously stated, normal transmission using the single-stage transistor amplifier is established upon depression of the button 26. This allows the transmission circuit 35 to complete the connection between the collector and the base of the transistor. The complete circuit is traced as follows: from the collector to the contact 32 of the switch 18, the blade 28 of the switch, the wire 44, the load circuit comprising the receiving transducer 42 and switch 18 of the receiving instrument, the wire 36, and the resistor 40, to the base of the transistor. The emitter-base circuit remains permanently connected, and the voltage drop across the resistor 40 provides the bias for the collector. The condenser 50 is preferably of the type normally used for direct current isolation, and may be of the electrolytic type.

For purposes of receiving, the button 26 is released, thereby removing the negative bias from the collector of the transistor, and causing the coil of the receiving transducer to be connected directly across the transmission line. In this condition of the circuit, both amplified and unamplified transmissions may be received. Also, by talking into the earpiece the operator may transmit a sound-powered voice message, subject to the same distance limitations that are encountered in connection with conventional sound-powered systems. Since the above-described circuit is used for both transmission and reception, it is obvious that the external transmission circuit 35 in Fig. 2 may be identical.

It will be understood that the system described is readily adaptable to many other types of sound-powered phone systems and other apparatus based on sound-powered units, such as small intercommunication systems for vessels, aircraft, railroads, offices, or the like.

It will be understood that, while the invention has been described with reference to a specific preferred embodiment, various modifications of structure including arrangements of the various circuit elements and other changes that will occur to those skilled in the art in adapting the invention to various conditions of operation and use, may be effectuated without departing from the spirit or scope of the invention.

Having thus described the invention, I claim:

1. A telephone instrument having, in combination, a pair of electro-acoustical transducers, a transfer switch, a first circuit connecting one transducer through one side of said switch to an external transmission circuit, and a second circuit having a transistor provided with a base, an emitter and a collector, an impedance connected to the base of the transistor, a direct current source connected to the emitter of the transistor and to the end of the impedance opposite to the base, a direct-current isolating circuit connecting the base and emitter through the other transducer, and connections between the collector and base through the other side of said switch, said source causing a direct current in the emitter-base circuit which generates a voltage of appropriate magnitude and polarity to provide normal bias for the collector when the collector-base circuit is closed through said switch, said transmission circuit and said impedance, whereby the instrument is adapted to use one of said transducers for sound-powered transmission when the switch closes said first circuit.

2. A telephone instrument having, in combination, a pair of electro-acoustical transducers, a transfer switch, a first circuit connecting one transducer through one side of said switch to an external transmission circuit, and a second circuit having a transistor provided with a base, an emitter and a collector, an impedance which is large relative to the emitter-base impedance connected to the base of the transistor, a direct-current source connected to the emitter of the transistor and to the end of the impedance opposite to the base, a direct-current isolating circuit connecting the base and emitter through the other transducer, and connections between the collector and base through the other side of said switch, said transmission circuit and said impedance, said source causing a direct current in the emitter-base circuit which generates a voltage of appropriate magnitude and polarity to provide normal bias for the collector when the collector-base circuit is closed through said switch, whereby the instrument is adapted to use one of said transducers for sound-powered transmission when the switch closes said first circuit.

3. A telephone instrument having, in combination, a pair of electro-acoustical transducers, a transfer switch having a center contact connected to one terminal of an external transmission circuit, one of said transducers being connected at one end to a second terminal of said transmission circuit and at the other end to a side contact of said switch, a transistor provided with a base, an emitter and a collector, a connection from the collector of the transistor to the other side contact of said switch, an impedance connected between the base of the transistor and said second terminal, a direct current source connected between the emitter of the transistor and said second terminal, and a direct-current isolating circuit connecting the base and emitter through the other transducer, whereby the instrument is adapted to use one of said transducers for sound-powered transmission when the first-mentioned side contact is connected to the center contact of said switch.

References Cited in the file of this patent

UNITED STATES PATENTS

| | | |
|---|---|---|
| 2,376,367 | Leibe | May 22, 1945 |
| 2,613,282 | Scaife | Oct. 7, 1952 |
| 2,686,834 | Gottlieb | Aug. 17, 1954 |